Patented Feb. 15, 1927.

1,617,476

UNITED STATES PATENT OFFICE.

HAROLD S. CHRISTOPHER, OF BERKELEY, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

DECOLORIZING AND CLARIFYING AGENT.

No Drawing. Application filed September 30, 1922. Serial No. 591,653.

This invention relates to the art of decolorizing and clarifying petroleum oils.

An object of this invention is to produce synthetically hydrous aluminum silicates and hydrous silicas which possess clarifying powers materially in excess of those silicates and silicas which exists in filtering media commonly used in the treatment of petroleum oils, such for instance, as fuller's earth.

In its preferred use, another important object of this invention is to provide a process which may utilize the waste acid liquor, incidental to the treatment of various clays and earths with acid, in the preparation of these clarifying and decolorizing materials.

Another object of this invention is to provide a process by which these products may be economically produced.

With the foregoing preliminary remarks my invention and further objects and advantages thereof will be more thoroughly understood by reference to a preferred process for the production of clarifying or decolorizing materials embodying the principles of my invention.

The sulphuric acid extract from the treatment of fuller's earth or similar clays contains a large percentage of aluminum sulphate in solution. In the practice of my process this acid extract is filtered to obtain a clear solution and then neutralized preferably by the addition of sodium hydroxide. Other sources of soluble aluminum salts may be used in my invention. To this neutralized liquor is then added a solution of soluble silicate preferably a material low in cost, such as, sodium silicate. The solutions should be mixed under appropriate conditions of temperature and concentration to produce a gelatinous precipitate of hydrous aluminum silicate. I have found that for the production of the best products, these liquids should be mixed according to the proportions of 1 volume of neutralized acid liquor, containing one part by weight of aluminum sulphate having the formula $Al_2(SO_4)_3$, to 8.3 parts by weight of a 40° Baumé solution of sodium silicate. The temperature should preferably be limited to 80° F.

The precipitate so formed is then separated by some suitable means such as filtration and thoroughly washed with water to remove all the soluble salts. The washing process may be conducted either upon the wet precipitate or upon the precipitate after it has been dried. The drying of the wet precipitate may be carried out in substantially the usual or customary manner of drying analogous products. It is desirable, however, to effect a complete removal of all the water soluble salts in order to secure the highest degree of activity in the final product. By this means I obtain substantially pure aluminum silicates which differ from aluminum silicates heretofore produced either in chemical structure or physical or colloidal state as the hydrous aluminum silicates are found to possess to a very marked extent the property of clarifying and decolorizing petroleum oils. The purified precipitate is then dried, and crushed or ground according to the manner in which it is to be utilized.

This material may be utilized in a manner similar to fuller's earth for which purpose it may be crushed and screened to the proper size and placed in a percolating vessel. The oil is then decolorized or clarified by percolating through the material under the influence of gravity. Another method is to pulverize the dried precipitate, agitate the oil with the pulverized material and subsequently separate the oil from the material by some suitable process such as filtration.

The hydrous silicas are produced from the hydrous aluminum silicates by treating the precipitate with sulphuric acid until the aluminum is removed. A very porous form of hydrous silica is thus formed which may be used in a manner similar to the hydrous silicates of aluminum.

These hydrous aluminum silicates and hydrous silicas are markedly different in their properties and structure from other hydrous aluminum silicates and hydrous silicas hitherto produced. This particularly manifests itself in their action on petroleum oils. It is extremely difficult to define these products in and except through their relative action on petroleum oils. Generally, however, the aluminum silicates have a relatively low proportion of aluminum and correspond as nearly as determined to the empirical formula $Al_2O_3.12(SiO_2).2H_2O$. The product is substantially free of alkali metal content and the empirical formula represents substantially the entire product. Likewise the hydrous silicas generally correspond to the formula $6(SiO_2).H_2O$. These formulæ are not given as indicating the chemical structure or exact proportions of the compounds, but simply to indicate generally the relative proportions of the ingredients. It is believed also that the products do not consist of a single substance such as a single hydrous aluminum silicate or a single hydrous silica compound, but there is a group of different hydrous aluminum silicates or hydrous silica present, just as for example petroleum oil is a mixture of different hydrocarbons.

It appears that the aforesaid precipitation of hydrous aluminum silicates results in the product possessing compounds having a certain silica structure which structure is retained even after the extraction of aluminum. Other metals which produce complex series of silicates might be used and under the proper conditions produce equivalent structures.

It is understood that my invention is not limited to the preferred embodiment described, but is of the scope set forth in the following claim.

I claim:

As a new article of manufacture substantially pure hydrous aluminum silicates having active decolorizing or clarifying properties, with reference to petroleum oil, comparatively low in aluminum content and corresponding substantially to the empirical formula $Al_2O_3.12(SiO_2).2H_2O$.

Signed at Richmond, Calif., this 21st day of Sept., 1922.

HAROLD S. CHRISTOPHER.